(12) United States Patent
Fink et al.

(10) Patent No.: US 12,118,013 B2
(45) Date of Patent: *Oct. 15, 2024

(54) DATA STRUCTURE BASED ON EVENT COMPACTION AND READ-OFFSETS

(71) Applicant: Palantir Technologies Inc., Denver, CO (US)

(72) Inventors: Robert Fink, Munich (DE); James Baker, London (GB); Mark Elliot, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,562

(22) Filed: Sep. 25, 2023

(65) Prior Publication Data

US 2024/0012830 A1 Jan. 11, 2024

Related U.S. Application Data

(63) Continuation of application No. 17/644,426, filed on Dec. 15, 2021, now Pat. No. 11,803,566.

(30) Foreign Application Priority Data

Dec. 21, 2020 (EP) ..................................... 20216132

(51) Int. Cl.
*G06F 16/25* (2019.01)
*G06F 16/23* (2019.01)
*G06F 16/2457* (2019.01)

(52) U.S. Cl.
CPC ........ *G06F 16/254* (2019.01); *G06F 16/2358* (2019.01); *G06F 16/2457* (2019.01)

(58) Field of Classification Search
None
See application file for complete search history.

(56) References Cited

U.S. PATENT DOCUMENTS 8,601,214 B1 12/2013 Chakalian et al.
9,390,450 B1 7/2016 Hart et al.
(Continued)

FOREIGN PATENT DOCUMENTS

EP 4016322 6/2022

OTHER PUBLICATIONS

U.S. Pat. No. 11,803,566, Data Structure Based on Event Compaction and Read-Offsets, Oct. 31, 2023.
(Continued)

*Primary Examiner* — Richard L Bowen
(74) *Attorney, Agent, or Firm* — Knobbe, Martens, Olson & Bear, LLP (57) ABSTRACT

Disclosed herein are systems and computer-implemented methods that include storing a sequence of events, each event associated with a sequence number indicating a temporal position of an event within the sequence of events; further storing one or more read-offsets that are associated with respective consumers and that indicate the sequence number up to which the respective consumers have read events within the sequence of events; determining a smallest read-offset of all read-offsets; compacting events and/or earlier snapshots with sequence numbers smaller than the smallest read-offset into a new snapshot; and replacing, in the sequence of events, the events and/or earlier snapshots with sequence numbers smaller than the smallest read-offset with the new snapshot.

20 Claims, 9 Drawing Sheets

(56) References Cited

U.S. PATENT DOCUMENTS

| | | |
|---|---|---|
| 10,372,926 B1 | 8/2019 | Leshinsky et al. |
| 10,838,817 B1 | 11/2020 | Joo et al. |
| 10,866,968 B1 | 12/2020 | Cole et al. |
| 11,347,416 B1 | 5/2022 | Danilov et al. |
| 11,347,571 B1 | 5/2022 | Paduroiu |
| 11,803,566 B2 | 10/2023 | Fink et al. |
| 2006/0265228 A1 | 11/2006 | Ando |
| 2011/0196833 A1 | 8/2011 | Drobychev et al. |
| 2014/0279920 A1 | 9/2014 | Madhavarapu et al. |
| 2015/0261805 A1 | 9/2015 | Lee et al. |
| 2017/0262489 A1 | 9/2017 | Seo |
| 2018/0107562 A1 | 4/2018 | Goodman et al. |
| 2020/0250172 A1 | 8/2020 | Busjaeger et al. |

OTHER PUBLICATIONS

Fink, Robert, "On Monotonicity in Relational Databases and Service-oriented Architecture", Palantir.com, https://blog.palantir.com/on-monotonicity-in-relational-databases-and-service-oriented-architecture-90b0a848dd3d, Nov. 19, 2020, 7 pages.

"Kafka Architecture: Log Compaction", Cloudurable.com, http://cloudurable.com/blog/kafka-architecture-log-compaction/index.html, May 18, 2017, 10 pages.

Official Communication for European Patent Application No. 20216132.9 dated May 26, 2021, 8 pages.

| | | |
|---|---|---|
| E1 | Create Address Entry | { Name = Martin Schneider, Street = Washington Street, Number = 19, City = New York, Postcode = 12345 } |
| E2 | Update | { Street = Old Franklin Street, Number = 13 } |
| E3 | Update | { Street = Vermont Street, Number = 15 } |
| E4 | Update | { Number = 27 } |
| E5 | Update | { Street = Hambury Street, Number = 18, Postcode = 45678, City = San Francisco } |

*FIG. 5a*

Log Compaction  $S_5 = \{$ Name = Martin Schneider,
Street = Hambury Street,
Number = 18,
Postcode = 45678,
City = San Francisco $\}$

DATA STRUCTURE BASED ON EVENT COMPACTION AND READ-OFFSETS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

Technical Field

This disclosure relates to an event log data structure based on CRUD and event sourcing principles.

BACKGROUND

Field of the Invention

One approach of data storage management is referred to by the acronym CRUD (Create, Read, Update, and Delete) which are the four basic functions of persistent storage. Alternative words are sometimes used when defining the four basic functions of CRUD, such as retrieve instead of read, modify instead of update, or destroy instead of delete.

The acronym CRUD refers to all of the major functions that are implemented in relational database applications. Each letter in the acronym can map to a standard Structured Query Language (SQL) statement, Hypertext Transfer Protocol (HTTP) or Data Distribution Service (DDS) operation. The operations Create, Read, Update and Delete and implemented by Insert, Select, Update and Delete in SQL, by Put, Get, Put and Delete in HTTP and Write, Read Write and Dispose in DDS, respectively.

CRUD is also relevant at an API level of most applications, for example in standard REST APIs. For example, in an address book software, the basic storage unit is an individual contact record. As a minimum, the software must allow the user to create or add new records; read, retrieve, search, or view existing records; update or edit existing records; delete, deactivate, or remove existing records. CRUD APIs have low storage requirements, in particular in scenarios where many edits are performed, and have constant access latency for GET operations.

Another contrasting approach of data storage management is referred to as "event sourcing" model. In this approach, any data changes are not directly materialized into the data storage but an ordered data log is maintained in which all changes/mutations are recorded as "events" such that each event log entry is immutable and the log of all mutation events fully defines the current state of the database. Since the data log is constantly growing, retrieving the current state of a record may suffer from latency problems, in particular in situations where a service must bootstrap the current database state by reading all previous mutation events from the log.

SUMMARY

According to a first aspect, a data structure is provided. The data structure includes a sequence of events, each event associated with a sequence number indicating a temporal position of an event within the sequence of events; one or more read-offsets, each read-offset associated with a consumer of the data structure, wherein each read-offset indicates a sequence number up to which a consumer has read events within the sequence of events; and at least one snapshot which represents events with sequence numbers smaller than the smallest read-offset in a compacted form.

According to a second aspect, a computer-implemented method is provided of maintaining a data structure as defined according to the first aspect. The method includes determining a smallest read-offset of all read-offsets of one or more consumers of the data structure; determining whether there exist one or more events subsequent to the snapshot and with sequence numbers smaller than the smallest read-offset. In response to determining that there exist one or more events subsequent to the snapshot and with sequence numbers smaller than the smallest read-offset, compacting the snapshot with these determined events into a new snapshot and replacing the snapshot and these determined with the new snapshot.

According to a third aspect, a computer-implemented method is provided. The method is performed on a sequence of events accessible by a plurality of consumers, each event associated with a sequence number indicating a temporal position of an event within the sequence of events, each consumer associated with a read-offset indicating the sequence number up to which the consumer has read events within the sequence of events. The method includes determining a smallest read-offset of all read-offsets; compacting events with sequence numbers smaller than the smallest read-offset into a snapshot; and replacing, in the sequence of events, the events with sequence numbers smaller than the smallest read-offset with the snapshot.

According to a fourth aspect, a computer-implemented method is provided of determining a current state of a record stored in a data storage using the data structure of the first aspect. The method includes reading the snapshot and the events to determine the current state of the record.

According to a fifth aspect, a computer-readable medium is provided on which the data structure according to the first aspect is stored.

According to a sixth aspect, a computer-readable medium is provided which includes computer executable instructions stored thereon which, when executed by one or more processors, cause the one or more processors to perform the method according to the second or the third aspect.

According to a seventh aspect, a computing system is provided which includes one or more processors; and one or more computer-readable media comprising computer executable instructions stored therein which, when executed by the one or more processors cause the one or more processors to perform the method according to the second or third aspect.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the scope of protection.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiment, in which the principles are utilized, and the accompanying drawings of which:

The figures depict various embodiments of the disclosed technology for purposes of illustration only. One skilled in the art will readily recognize from the following discussion that alternative embodiments of the structures and methods illustrated in the figures can be employed without departing from the principles of the disclosed technology described herein.

DETAILED DESCRIPTION

Figure 1:
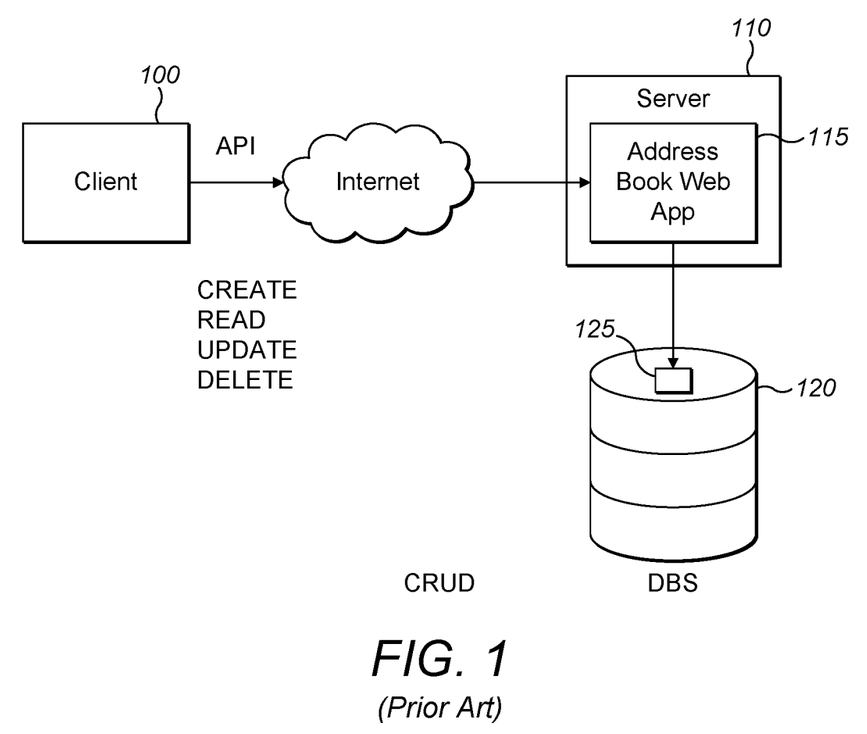
FIG. 1 shows an architecture in which the CRUD principles have been implemented according to the prior art.

FIG. 1 shows an architecture in which the CRUD principles are implemented. Before discussing the embodiment shown in FIG. 1 in more detail, a few items of this specification will be discussed.

Some of the embodiments relate to a data structure which includes a sequence of events, each event associated with a sequence number indicating a temporal position of an event within the sequence of events; one or more read-offsets, each read-offset associated with a consumer, wherein each read-offset indicates a sequence number up to which a consumer has read events within the sequence of events; and at least one snapshot which represents events with sequence numbers smaller than the smallest read-offset in a compacted form. In some of the embodiments, the compacted form is achieved by log compaction, e.g. as it is described for the KAFKA architecture, see for example http://cloudurable-.com/blog/kafka-architecture-log-comp action/index.html.

It should be noted that "log compaction" is also referred to as "projection" in the event-sourcing community. The terms "small", "smaller" or "smallest" as used herein refer to a sequence number of events. The sequence number temporally orders the events within a sequence of events so that a first event having a smaller sequence number than a second event means that the first event occurs earlier than/before the second event.

A "read-offset" as used herein is associated with a consumer and indicates the sequence number up to which the consumer has read the events in a sequence of events. In some of the embodiments, the snapshot requires less storage than the events it represents. In some of the embodiments, the snapshot represents all events having sequence numbers smaller than the smallest read-offset. In other embodiments the snapshot represents only a subset of all of the events having sequence numbers smaller than the smallest read-offset.

In some of the embodiments, the snapshot is stored in an external storage which is arranged to handle large key value stores. In some of the embodiments, the external storage is a Cassandra Cluster or a S3-Bucket.

In some of the embodiments, the consumer is a user or process that is arranged to add an event or read an event.

In some of the embodiments, the data structure forms an event log and is part of a database application layer.

In some of the embodiments, the events are operations performed on a data storage. In some of the embodiments, the operations are at least one CREATE, UPDATE, READ and DELETE.

In some of the embodiments, the data storage is a database. In some of the embodiments, the sequence of events is implemented as a datastream.

In some of the embodiments, the read-offset of a consumer is only allowed to increase but not to decrease which means that a consumer cannot read backwards. In other words, a consumer cannot read an event (again) that is smaller/temporally behind its current read-offset.

Some of the embodiments relate to a computer-implemented method of maintaining a data structure as defined above. The method includes determining a smallest read-offset of all read-offsets of the plurality of consumers; determining whether there exist one or more events subsequent to the snapshot and with sequence numbers smaller than the smallest read-offset; and in response to determining that there exist one or more events with sequence numbers smaller than the smallest read-offset, compacting the snapshot with these determined events into a new snapshot and replacing the snapshot and these determined events with the new snapshot.

In some of the embodiments, only one event at a time is compacted with the current snapshot. In other embodiments the compacting is performed concurrently on non-overlapping, contiguous sequences of event. For example, referring to FIG. 5a, events E1-E3 could be compacted into snapshot S3 while at the same time events E4-E5 are compacted to snapshot S5. Further, snapshots S3 and S5 could be compacted into a new single snapshot S5' containing data from all events E1-E5.

Some embodiments relate to a computer-implemented method, wherein the method is performed on a sequence of events accessible by a plurality of consumers. The term "consumer" (also known as "client" or "observer") as used herein refers to a user or process that is allowed to perform operations on the sequence of events, e.g. add or read events to/from the sequence of events. Each event is associated with a sequence number indicating a temporal position of an event within the sequence of events. Each consumer is associated with a read-offset indicating the sequence number up to which the consumer has read events within the sequence of events. The method includes determining a smallest read-offset of all read-offsets of the plurality of consumers; compacting events with sequence numbers smaller than the smallest read-offset into a snapshot; and replacing, in the sequence of events, the events with sequence numbers smaller than the smallest read-offset with the snapshot.

In some of the embodiments, the snapshot requires less storage than the events with sequence numbers smaller than the smallest read-offset. In some of the embodiments, compacting events with sequence numbers smaller than the smallest read-offset into a snapshot includes compacting all events with sequence numbers smaller than the smallest read-offset into the snapshot. In some of the embodiments, the read-offsets are only increasing but never decreasing which means that a consumer is not allowed to read any events that have a sequence number that is smaller than its current read-offset, i.e. events that it had already read previously. In some of the embodiments, the events are operations performed on a data storage.

Some of the embodiments relate to a computer-implemented method of determining a current state of a record stored in a data storage using the data structure as described above. The method includes reading the snapshot and the events to determine the current state of the record.

Some of the embodiments relate to a computer-readable medium on which the data structure as described above is stored.

Some of the embodiments relate to a computer-readable medium which includes computer executable instructions stored thereon which, when executed by one or more processors, cause the one or more processors to perform the method as described above.

Some of the embodiments relate to a computing system which includes one or more processors; and one or more computer-readable media including computer executable instructions stored therein which, when executed by the one or more processors cause the one or more processors to perform the method as described above.

Returning now to FIG. 1 which shows a CRUD API in more detail. For example, a web service that has API endpoints for creating, updating or deleting certain data objects. Different API endpoints are created, one for creating, one for updating and one for deleting these objects. An activity that the user makes against this API is played directly into the database, for example an SQL database or a NoSQL database like an object store. It should be mentioned that whenever a user performs an action against the API, the corresponding action would be materialized into the database.

In the example shown in FIG. 1, a user sitting at a client computing device 100 wants to use an Address Book Web Application 115 residing on a server 110 that is connected to a database system 120. The database system 120 stores address book records 125 in form of tables of a relational database model and consequently, there would an API for creating a new address record, for updating an address record and for deleting an address record. If a user wanted to enter a new address, he or she would perform a "CREATE address" call against this API and a new row would be inserted for instance in the database system 120 which is an SQL database system.

If then, the user wished to update this address to a new street or a new name of new city, he or she would make a second call, an UPDATE call, to update this address. Whatever it is that is changed would be immediately materialized into the database system 120 so that one row in the SQL database would be overwritten and the value of the corresponding cells of the newly added row would be overwritten.

And finally, if a user wanted to delete the address record, then he or she would make a DELETE call so that the row gets deleted from the database system 120. Put differently, the database mirrors status quo of what the data is that was created, updated or deleted through the API.

Figure 2:
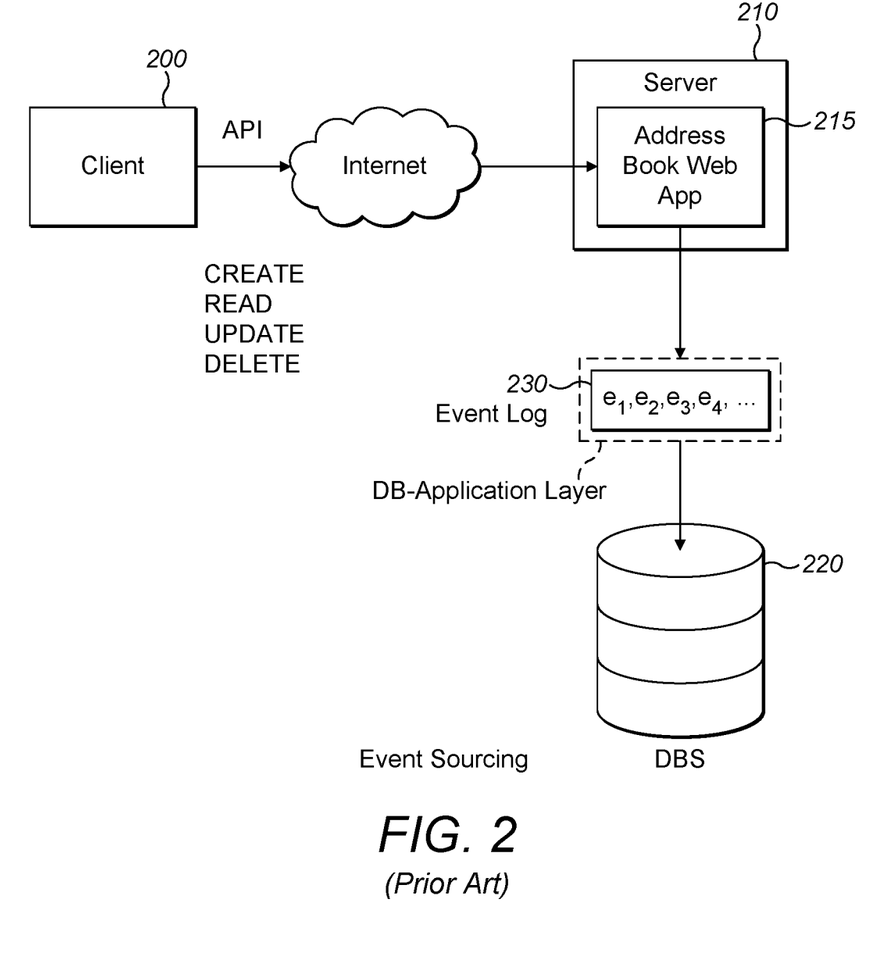
FIG. 2 illustrates an architecture based on event sourcing according to the prior art.

FIG. 2 shows an event sourcing model in more detail which is in contrast to the CRUD model shown in FIG. 1. A user sitting at a client computing device 200 wants to use an Address Book Web Application 215 residing on a server 210 that is connected to a database system 220. It is considered that the same API operations are used as shown in FIG. 1 for creating, reading, updating or deleting address book records, but instead of storing the effect of these operations into the database system 220, an event log 230, which logically belongs to a database application layer, is kept of all the calls that were made against the API. If a new address record is created, then a new entry/event is created in the event log 230 that indicates that a new address record was created with all parameters. If a user wanted to update the address record, an API call is made but this time instead of updating directly by overwriting the value in the database system 220, a second event is created in the event log 230 that contains the delta of the information between the first row that was created in first create call and the update call. In this case, this could be an entry that says, for instance, that in row number 17 of the database system 220 the street was updated to this new value. It is noted that the original value in the database system 220 is not overwritten. Instead, two entries have been created in the event log 230. Then, the user wishes to make a third call and delete the whole address record again. Instead of deleting row number 17 in the database system 220, a third entry would be created in the event log 230 that says that this address record is to be deleted again. The events are stored in the database system 220. If the database system 220 is an SQL database, then events can be stored in a single table index by sequence number, and if the database is a stream database (e.g. KAFKA), then events are added to the stream.

In comparison, the three log entries conceptually store the same information as the three API calls shown in FIG. 1. However, when comparing the properties of the two approaches, there are differences. The first CRUD approach is more lossy because once a record is deleted, any trace of that record is gone. If there is an API consumer that lists all the addresses in his address book over an API call at some point in time and it has 17 addresses and then some addresses are deleted, then later that information would actually be gone. By contrast, in the event sourcing approach of FIG. 2, if e.g. 17 address book records are created and then three address book records are deleted, then the log contains 17 "create" entries and three "delete" entries but all information is still available and no information has been lost. In other words, the history of all of the changes that were made to the database system 220 are retained. One could say that the event sourcing model is more expressive and the CRUD model is more lossy.

But there are disadvantages, for example, if a new server is started that serves the API. In this case, the new server has to read through all log entries that were created over time to get to the status quo of what the current correct data is. That means the log entries are read that created address records and then the log entries are read that updated the records. To get the current data, one has to read through all entries which leads to latency demands. If a new server is started, it has to read through all of the log entries before it can answer a question, wherein in the CRUD model, the question could be answered instantaneously because all of the information was already materialized in the database system 120. The other problem is the increasing storage requirements of the event sourcing model. Over time, more and more log entries have to be read in order to be able to find out the status quo.

|              | Advantage                                                                   | Disadvantage                                                          |
|--------------|-----------------------------------------------------------------------------|-----------------------------------------------------------------------|
| CRUD         | Little Storage Requirements; Low Latency                                    | No monotonicity; Lossy Information lost;                              |
| Event Sourcing | Monotonicity; Expressive; No Information lost                             | High Storage Requirements; High Latency                               |

As an analogy in the physical world, one could consider a physical address book which one has on a desk. In the CRUD model, a user would put Tipp-Ex® over the old address and write the new address over the white Tipp-Ex field. This means that a user always has the current correct information present in front of him or her but loses the history. In the event sourcing model, a first address is written down and then if something changes, a sticky note is put on it that hides (but does not overwrite) it. If again a something changes, another sticky note is put on the previous sticky note. This allows to go back in time and in history, but if the current state is required, one has to read through all sticky notes to come to find out what the current address is.

Figure 3:
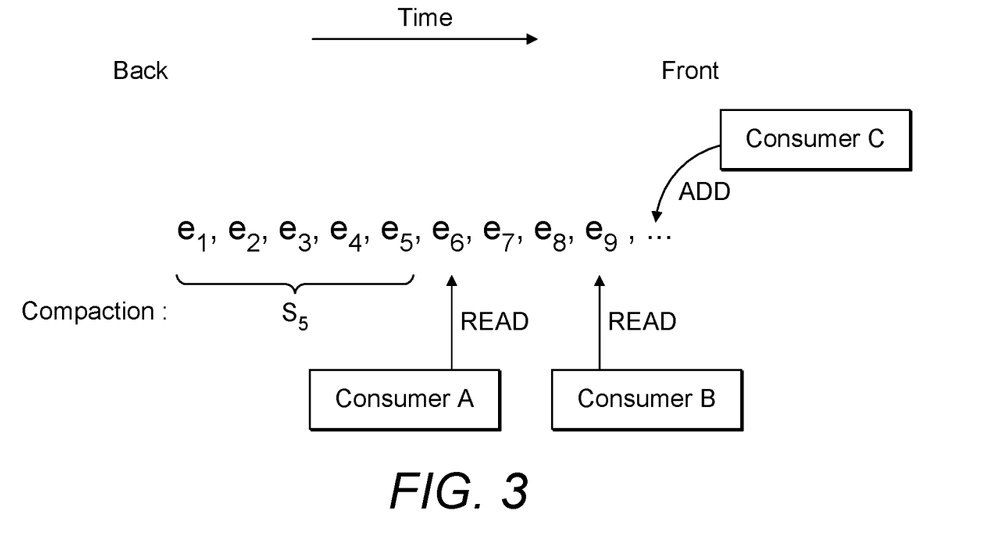
FIG. 3 illustrates log compaction and maintenance of read-offsets according to embodiments of this specification.

FIG. 3 shows the basic principles behind embodiments of this specification which include (a) log compaction and (b) to use a read-offset for each consumer. The idea behind log compaction is instead of keeping the full event log, one starts to compact it and to replace individual log entries with snapshot information. It should be noted that log compaction by itself is non-monotonic because it removes information. In the physical address book analogy, this would mean to take a stack of sticky notes and create a new sticky note that contains the projection of all of the edits on the various values. For example, if the street number has changed three times, only the latest one is kept. If the city has changed three times, only the latest one is kept. If the name of the person has changed four times, only the latest one is kept. In other words, old information is compacted away and only the latest information is kept. This allows to compact the whole sequence of events. This log compaction is reminiscent of the CRUD model where updates are immediately materialized into the database and leads to reduced storage requirements. However, if the log compaction is done too aggressively, then one has again the disadvantages of the CRUD model that one wanted to avoid. In order to avoid this, embodiments of this specification aim at using information about the consumers to make the compaction smarter.

In the example of FIG. 3, consumers may create events and insert them into the sequence of events at the front (right end) of the sequence of events which represents the most recent event in time whereas the events at the back (left end) of the sequence are the oldest events. Technically, the sequence of events may be implemented as a datastream. In the example shown, Consumer C has just added a new event e9 at the beginning of the sequence of events. Consumers may also read the events and it is kept track of how far (up to which sequence number) a consumer has already read the events in the sequence of events. In the example shown, Consumer A has read up to (and including) event with the sequence number 5 and therefore is assigned a read-offset of "6", whereas Consumer B has read all events up to (and including) event with the sequence number 8 and therefore is assigned a read-offset of "9". If the temporal positions are known up to which the consumers have read the event log, then it can be derived from this information how far the events may be compacted maximally without providing inconsistent views to the consumers. On the one hand, the compaction may be performed reluctantly only up to an event whose sequence number is much smaller than the smallest read-offset so that consistent views are maintained. However, in this case, the problem of increasing latency and increasing data storage requirements becomes more prevalent. If, on the other hand, the compaction is done too aggressively and involves events which have not been read by all consumers, the problem of inconsistent views arises which will be explained below with reference to FIG. 6 and which is avoided by embodiments of this specification. Embodiments of this specification achieve to find the balance between too reluctant and too aggressive compacting. In the example shown, the smallest/earliest read-offset is that of consumer B, namely the sequence number 6. Therefore, all events up and including e5 can be safely compacted. Therefore, in the example shown, e1, e2, e3, e4, e5 are compacted into snapshot s5 which is smaller in size that than the individual events. Please note that once the compaction has taken place, the individual events e1, e2, e3, e4 and e5 cannot be reconstructed any more. S5 replaces the events e1, e2, e3, e4 and e5 in the sequence of events. A new consumer, e.g. Consumer C requesting access to the event log, would only see s5 and the subsequent individual events e6, e7, e8, e9. Thereby, the storage requirements are reduced (because events e1, e2, e3, e4 and e5 are no longer stored) and the latency requirements for the consumers are also reduced since the consumers that want to know the current state do not have to go through the individual events e1, e2, e3, e4 and e5 but just have to read snapshot s5. While storage requirements and latency have been reduced, it has been ensured that consumers never get to see an inconsistent state since the log compaction has not been performed blindly but only up until the earliest/smallest read-offset which means that all events that are still in the process of being consumed by one of the consumers have not been compacted. If a new consumer is added to the list of consumers, then it is only presented snapshot s5, and subsequent events e6, e7, e8 and e9.

Summarizing, this idea combines the advantages of an event sourcing API with that of a CRUD style API. It has the latency benefits, it has reduced storage requirements, but it still gives a consistent view of how the data has changed. More precisely, the consistency requirement is referred to as monotonicity which means that consumers can never observe that data disappears. (A detailed introduction into monotonicity in relation databases and service-oriented architecture can be found under the following link: https://medium.com/palantir/on-monotonicity-in-relational-data-bases-and-service-oriented-architecture-90b0a848dd3d) Put differently, embodiments of this specification allow to preserve the monotonicity property while at the same time increasing performance of the event log (access time and storage requirements of event log).

Figure 4:
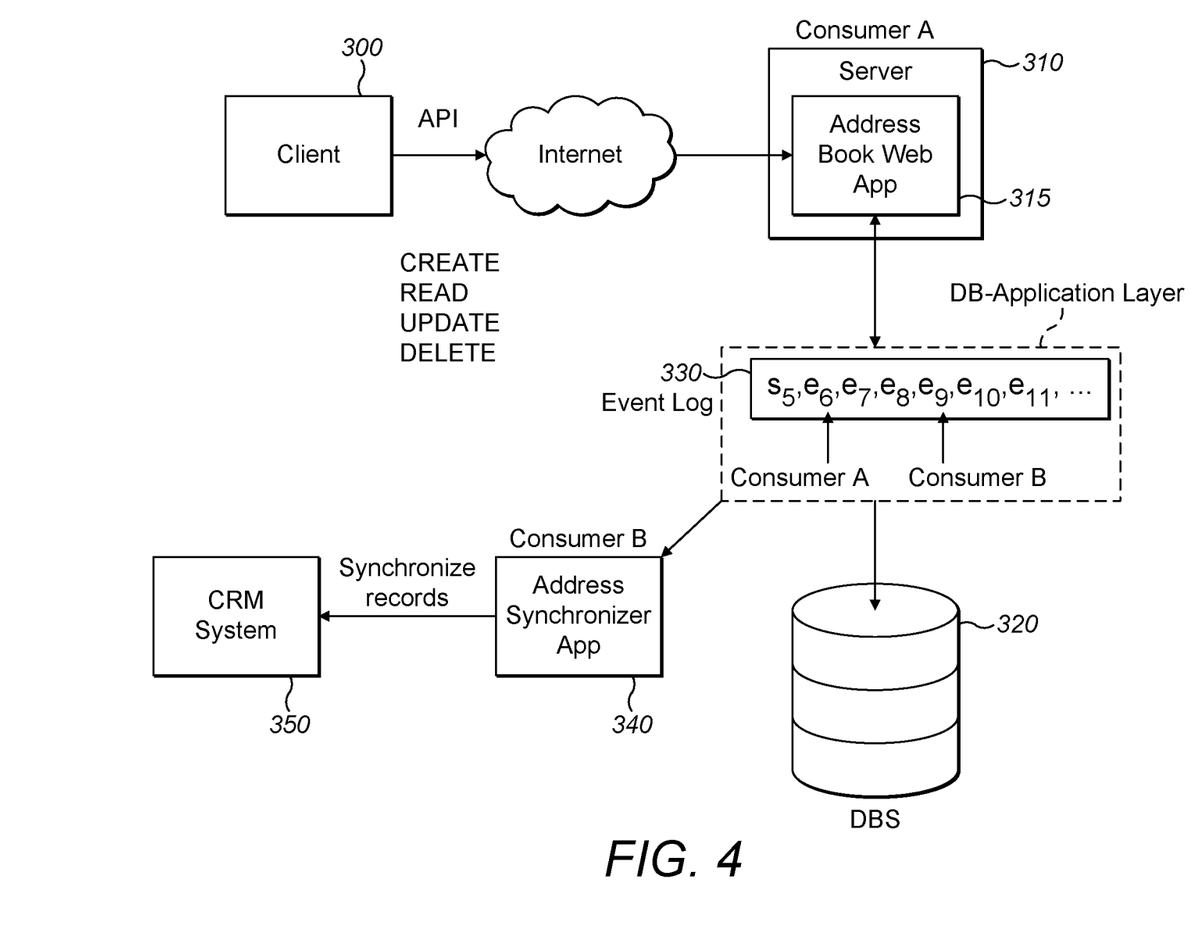
FIG. 4 shows an architecture according to embodiments of this specification.

FIG. 4 shows an architecture in which embodiments of this specification are implemented. It is considered to have the same API operations as shown in FIGS. 1 and 2 for creating, updating or deleting these address book records, but instead of storing the effect of these operations into a database system 320, an event log 330, which is logically part of a database application layer, is kept of all the calls that were made against the API. The events are stored in the database system 320. If the database system 320 is an SQL database, then events can be stored in a single table index by sequence number, and if the database is a stream database (e.g. KAFKA), then events are added to the stream. If a new address record is created, then a new entry/event is created in the event log 330 that indicates that a new address record was created with all parameters. If a user wants to update the address record, an API call is made but this time instead of updating directly by overwriting the value in the database, a second event is created in the event log 330 that contains the delta of the information between the first row that was created in first create call and the update call. A read-offset for Consumer A is shown which points to event e6, which means that Consumer A has read event e5 but not yet event e6, and a read-offset for Consumer B is shown which points to event e9, which means that Consumer B has read event e8 but not yet event e9. In the example shown, the events e1-e5 have already been compacted into snapshot s5. In the example shown, Consumer A is an Address Book Web Application 315 (as shown in FIGS. 1 and 2) and Consumer B is an Address Synchronizer App 340 which synchronizes records in a customer relationship management (CRM) system 350.

Figure 5A:
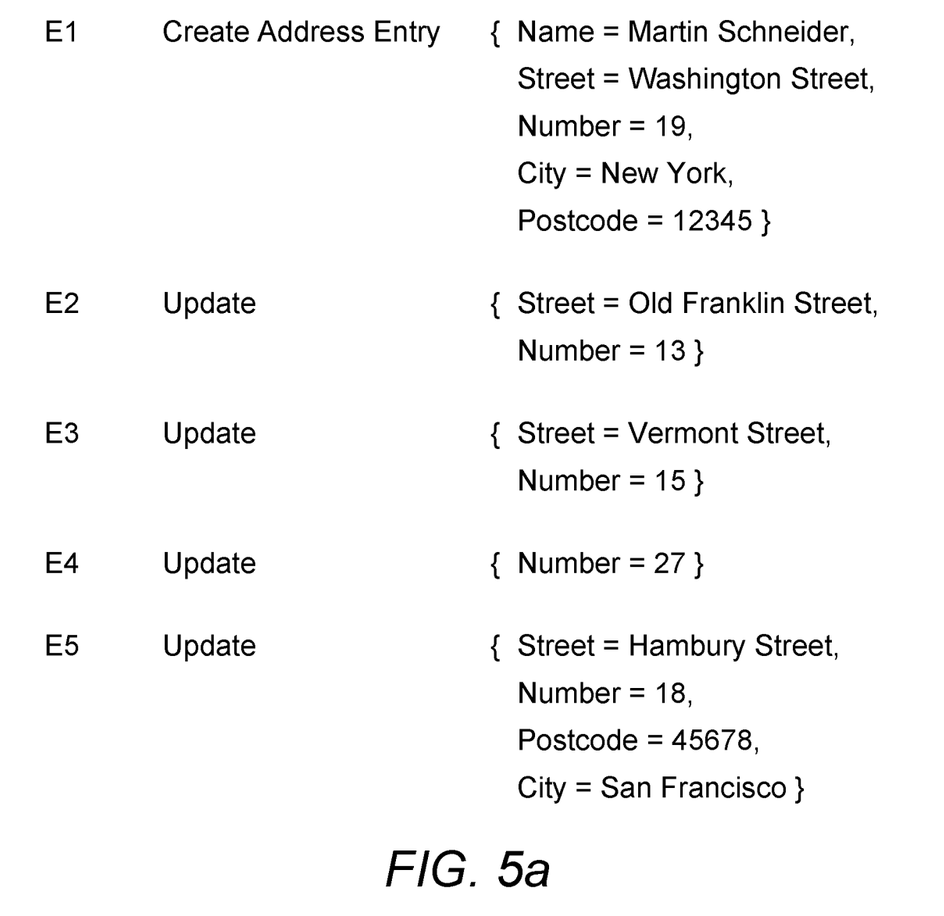
FIGS. 5A-5B illustrate the principle of log compaction in more detail.
Figure 5B:
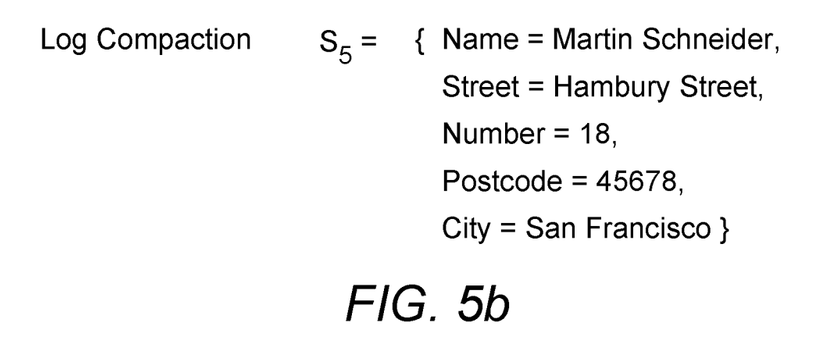

FIG. 5a illustrates a sequence of events before a log compaction is performed in more detail. At event 1, an address entry is created, represented by "create" event E1, which refers to a fictitious person called Martin Schneider, who lives in Washington Street 19, in the city of New York with postcode 12345. It is assumed that this person now moves to another place but within the same city, namely to Old Franklin Street 13 so that an "update" event E2 is added to the event log which updates the street name and the number. The person then moves again within New York to Vermont Street 15 which leads to an "update" event E3. The person moves then within the same street from number 15 to number 27 which leads to "update" event E4. Finally, the person moves to Hamburg Street 18, in 45678 San Francisco which leads to "update" event E5. If now a log compaction is performed, this will result in snapshot S5 which is shown on FIG. 5b. While the snapshot S5 needs less storage than the individual events E1, E2, E3, E4 and E5 also the latency time to determine the current address is now reduced. On the other hand, the history has been lost and it cannot be determined anymore where Martin Schneider lived before he moved to San Francisco.

Figure 6:
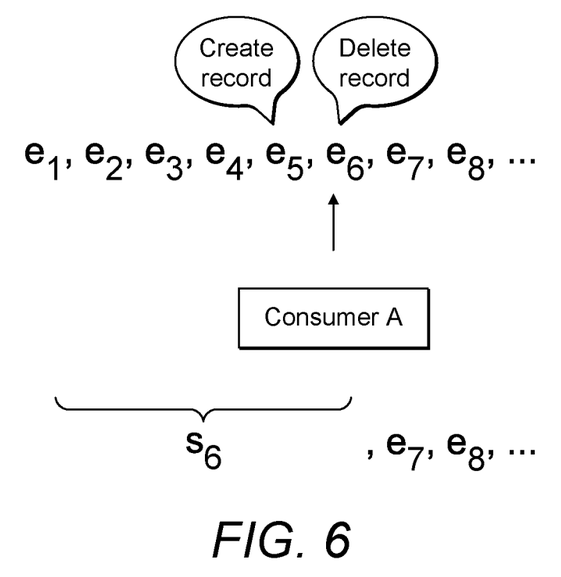
FIG. 6 illustrates the problem of inconsistent views that is avoided by embodiments of this specification.

FIG. 6 illustrates the inconsistency problem that is avoided by embodiments of this specification. FIG. 6 refers to the setting of FIG. 4 with Consumer A (Address Book Web App 315) and Consumer B (Address Synchronizer App 340) and shows a sequence of events in which a record is created at event e5 and deleted again at event e6. Event e5 has been read by Consumer B, which is a synchronization service with an external CRM system 350 and whose read-offset is now pointing to event e6 since it has read e5 but not yet e6. However, if now log compaction were done in order to compact events e1, e2, e3, e4, e5 and e6 into s6, then Consumer B could not propagate the "delete" event e6 to the CRM system 350 because it was compacted away. Rather, Consumer B reads s6 in which the record does not appear anymore, this would seem inconsistent to consumer B since a record that it has just read is simply gone. If the compaction only involved e1-e5, then consumer B could still read event e6 in which it is informed that the record has been deleted which appears to be consistent and the monotonicity requirement would be preserved. To achieve consistency, it is also ensured that a new consumer is only presented the most recent snapshot and all subsequent events.

Figure 7:
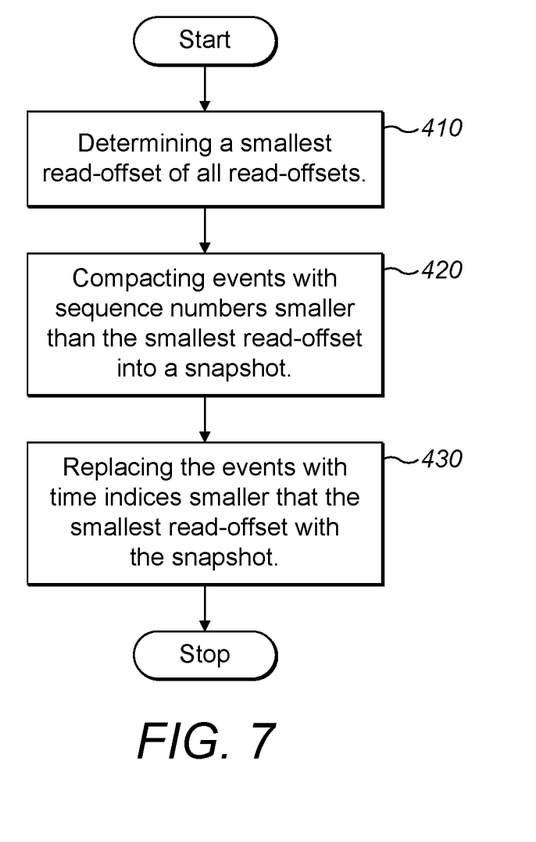
FIG. 7 depicts a flow diagram which shows in detail a method according to this specification.

FIG. 7 is a flow diagram illustrating the method of compacting a part of an event log. The method is performed on a sequence of events accessible by a plurality of consumers of the event log. Each event is associated with a sequence number indicating a temporal position of an event within the sequence of events and each consumer is associated with a read-offset indicating the sequence number up to which the consumer has read events within the sequence of events. It should be noted that at the beginning of the procedure, there may be only individual events but no snapshots. At 410, a smallest read-offset of all read-offsets is determined. At 420, events with sequence number smaller than the smallest read-offsets are compacted into a snapshot. At 430, the events with sequence numbers smaller than the smallest read-offset are replaced, in the sequence of events, with the snapshot.

Figure 8:
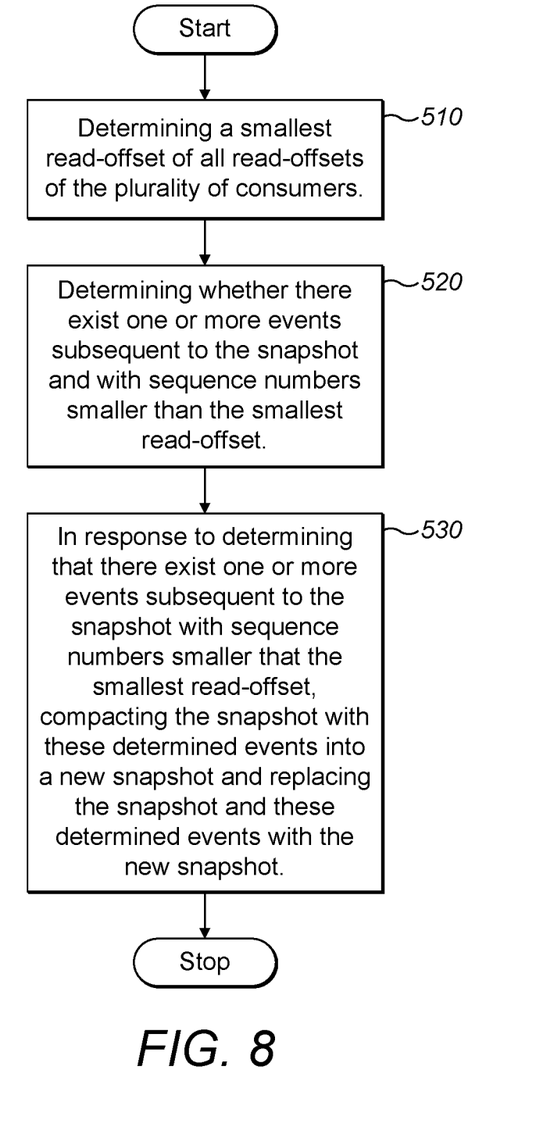
FIG. 8 depicts a flow diagram which shows in detail a method of maintaining a data structure as shown in FIG. 3.

FIG. 8 is a flow diagram illustrating a computer-implemented method of maintaining a data structure as defined in FIG. 3. At 510, a smallest read-offset of all read-offsets of a plurality of consumers is determined. At 520, it is determined whether there exist one or more events subsequent to the snapshot and with sequence numbers smaller than the smallest read-offset. At 530, in response to determining that there exist one or more events subsequent to the snapshot and with sequence numbers smaller than the smallest read-offset, the snapshot is compacted with these determined events into a new snapshot and the snapshot and these determined events are replaced with the new snapshot. It should be noted that multiple events can be compacted, multiple snapshots can be compacted and events and snapshots can be compacted.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field-programmable gate arrays (FPGAs) that are persistently programmed to perform the techniques, or may include one or more hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating system. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
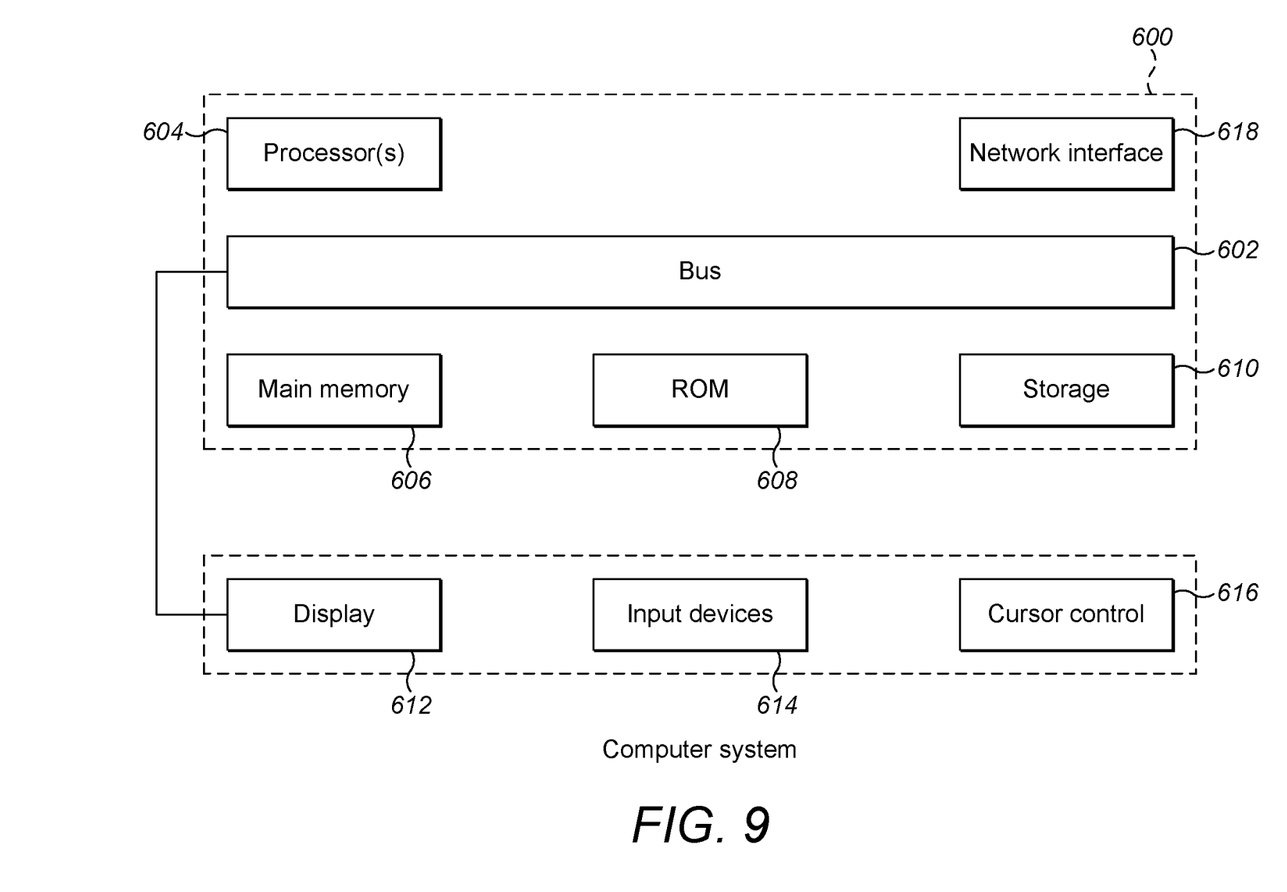
FIG. 9 is a block diagram that illustrates a computer device as well as a computer-readable medium up which any of the embodiments described herein may be implemented.

FIG. 9 is a block diagram that illustrates a computer system 600 upon which any of the embodiments of this specification may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operation specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as mouse, a trackball, or cursor directions keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, a same direction information and command selections as cursor control may be implemented via receiving touches on a touch screen without a cursor.

The computer system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module" as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM.

It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASIC or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media" and similar terms, as used herein refers to any media that store data and/or instructions that cause a machine to operate in specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical storage medium, any physical medium with patterns of holes, a RAM, a PROM, and EPROM, a FLASH-EPROM, NVRAM, any other memory chip or cartridge, and networked versions of a same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involves in carrying one or more sequences of one or more instructions to processor 604 for execution. For example, the instructions can initially be carried on a magnetic disk or solid state drive of a remote computer. The remote computer may load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

The computer system 600 also includes a communication interface 618 coupled to bus 602 via which encoded image data or encoded video data may be received. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signal that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combine in various ways. All possible combination and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can", "could", "might", or "may" unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in a way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modification may be made to the above-describe embodiments, the elements of which are to be understood as being among other acceptable examples. All such modifications and variations are intended to be included herein within the scope of this disclosure. The foregoing description details certain embodiments of the disclosure. It will be appreciated, however, that no matter how detailed the foregoing appears in text, the concept can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated. The scope of the protection should therefore be construed in accordance with the appended claims and equivalents thereof.

What is claimed is:

1. A system comprising:
    one or more processors configured to execute program instructions to cause the system to:
        store a sequence of events, each event associated with a sequence number indicating a temporal position of an event within the sequence of events;
        further store one or more read-offsets that are associated with respective consumers and that indicate the sequence number up to which the respective consumers have read events within the sequence of events;
        determine a smallest read-offset of all read-offsets;
        compact events and/or earlier snapshots with sequence numbers smaller than the smallest read-offset into a new snapshot; and
        replace, in the sequence of events, the events and/or earlier snapshots with sequence numbers smaller than the smallest read-offset with the new snapshot.

2. The system of claim 1, wherein the new snapshot requires less storage than the events and/or earlier snapshots with sequence numbers smaller than the smallest read-offset.

3. The system of claim 1, wherein compacting events and/or earlier snapshots with sequence numbers smaller than the smallest read-offset into the new snapshot comprises compacting all events and/or earlier snapshots with sequence numbers smaller that the smallest read-offset into the new snapshot.

4. The system of claim 1, wherein one event and/or earlier snapshot at a time is compacted with the new snapshot.

5. The system of claim 1, wherein the sequence of events and the one or more read-offsets are stored in a data structure.

6. The system of claim 5, wherein the data structure forms an event log and is part of a database application layer.

7. The system of claim 1, wherein the new snapshot requires less storage than the events and/or earlier snapshots it represents.

8. The system of claim 1, wherein the new snapshot represents all events and/or earlier snapshots having sequence numbers smaller than the smallest read-offset.

9. The system of claim 1, wherein the new snapshot is stored in an external storage which is arranged to handle large key value stores.

10. The system of claim 1, wherein the consumers are users or processes that are arranged to add events or read events.

11. A computer-implemented method comprising:

storing a sequence of events, each event associated with a sequence number indicating a temporal position of an event within the sequence of events;

further storing one or more read-offsets that are associated with respective consumers and that indicate the sequence number up to which the respective consumers have read events within the sequence of events;

determining a smallest read-offset of all read-offsets;

compacting events and/or earlier snapshots with sequence numbers smaller than the smallest read-offset into a new snapshot; and replacing, in the sequence of events, the events and/or earlier snapshots with sequence numbers smaller than the smallest read-offset with the new snapshot.

12. The computer-implemented method of claim 11, wherein the new snapshot requires less storage than the events and/or earlier snapshots with sequence numbers smaller than the smallest read-offset.

13. The computer-implemented method of claim 11, wherein compacting events and/or earlier snapshots with sequence numbers smaller than the smallest read-offset into the new snapshot comprises compacting all events and/or earlier snapshots with sequence numbers smaller that the smallest read-offset into the new snapshot.

14. The computer-implemented method of claim 11, wherein one event and/or earlier snapshot at a time is compacted with the new snapshot.

15. The computer-implemented method of claim 11, wherein the sequence of events and the one or more read-offsets are stored in a data structure.

16. The computer-implemented method of claim 15, wherein the data structure forms an event log and is part of a database application layer.

17. The computer-implemented method of claim 11, wherein the new snapshot requires less storage than the events and/or earlier snapshots it represents.

18. The computer-implemented method of claim 11, wherein the new snapshot represents all events and/or earlier snapshots having sequence numbers smaller than the smallest read-offset.

19. The computer-implemented method of claim 11, wherein the new snapshot is stored in an external storage which is arranged to handle large key value stores.

20. The computer-implemented method of claim 11, wherein the consumers are users or processes that are arranged to add events or read events.

* * * * *